(12) United States Patent
Sato et al.

(10) Patent No.: US 10,496,258 B2
(45) Date of Patent: Dec. 3, 2019

(54) INFORMATION PROCESSING DEVICE, INFORMATION PROCESSING METHOD, PROGRAM, AND INFORMATION STORAGE MEDIUM

(71) Applicant: SONY COMPUTER ENTERTAINMENT INC., Tokyo (JP)

(72) Inventors: Sumino Sato, Tokyo (JP); Norihiro Nagai, Tokyo (JP); Toru Yamamoto, Tokyo (JP); Yuji Nakamura, Tokyo (JP); Ryota Uchino, Tokyo (JP); Takeshi Nakagawa, Tokyo (JP); Makoto Saito, Tokyo (JP); Masanori Nomura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 295 days.

(21) Appl. No.: 14/759,932

(22) PCT Filed: Mar. 19, 2014

(86) PCT No.: PCT/JP2014/057482
§ 371 (c)(1),
(2) Date: Jul. 9, 2015

(87) PCT Pub. No.: WO2014/148532
PCT Pub. Date: Sep. 25, 2014

(65) Prior Publication Data
US 2015/0378569 A1    Dec. 31, 2015

(30) Foreign Application Priority Data
Mar. 22, 2013 (JP) .................. 2013-060526

(51) Int. Cl.
*G06F 3/048* (2013.01)
*G06F 3/0484* (2013.01)
*G06F 3/0486* (2013.01)

(52) U.S. Cl.
CPC ........ *G06F 3/04845* (2013.01); *G06F 3/0486* (2013.01); *G06F 3/04842* (2013.01)

(58) Field of Classification Search
CPC ...................................... G06F 3/048
See application file for complete search history.

(56) References Cited

U.S. PATENT DOCUMENTS 5,586,237 A     12/1996 Baecker et al.
9,285,980 B2 *  3/2016 Liu ................ G06F 3/04883
(Continued)

FOREIGN PATENT DOCUMENTS

CN    102387246 A    3/2012
CN    102622168 A    8/2012
(Continued)

OTHER PUBLICATIONS

How to delete apps from your iPod Touch, iPhone or iPad by Ross McKillop (Year: 2008).*
(Continued)

*Primary Examiner* — Mahelet Shiberou
(74) *Attorney, Agent, or Firm* — HEA Law PLLC

(57) ABSTRACT

An image of a folder linked to one program is displayed on a display section by a simpler operation than a conventional operation. A control section displays a program icon image on a display section, the program icon image being an image associated with a program, and being an image causing processing related to the program to be performed in response to reception of a predetermined operation on the image. The control section changes the program icon image displayed on the display section and associated with the (Continued)

program to a folder corresponding image in response to reception of an instruction to generate a folder linked to the program, the folder corresponding image being an image associated with the folder linked to the program, and being an image causing the program corresponding image associated with the program linked to the folder to be displayed on the display section in response to reception of the predetermined operation on the image.

11 Claims, 8 Drawing Sheets

(56) References Cited

U.S. PATENT DOCUMENTS

| | | | | |
|---|---|---|---|---|
| 2006/0069690 | A1* | 3/2006 | Patel | G06F 17/30126 |
| 2008/0148182 | A1* | 6/2008 | Chiang | G06F 3/0482 |
| | | | | 715/810 |
| 2008/0184112 | A1* | 7/2008 | Chiang | G06F 3/04817 |
| | | | | 715/700 |
| 2011/0202879 | A1* | 8/2011 | Stovicek | G06F 3/0482 |
| | | | | 715/828 |
| 2011/0246918 | A1* | 10/2011 | Henderson | G06F 3/04817 |
| | | | | 715/769 |
| 2011/0252346 | A1* | 10/2011 | Chaudhri | G06F 3/04817 |
| | | | | 715/765 |
| 2012/0030628 | A1* | 2/2012 | Lee | G06F 3/0486 |
| | | | | 715/835 |
| 2012/0052918 | A1 | 3/2012 | Yang | |
| 2012/0227077 | A1* | 9/2012 | Spivack | G06F 16/9535 |
| | | | | 725/110 |
| 2012/0304084 | A1* | 11/2012 | Kim | G06F 3/0486 |
| | | | | 715/762 |
| 2013/0024794 | A1* | 1/2013 | Ha | G06F 3/0485 |
| | | | | 715/765 |
| 2013/0050109 | A1* | 2/2013 | Ban | G06F 3/04883 |
| | | | | 345/173 |
| 2013/0067377 | A1* | 3/2013 | Rogers | G06F 3/04817 |
| | | | | 715/769 |
| 2013/0091467 | A1* | 4/2013 | Pallakoff | G06F 3/0482 |
| | | | | 715/835 |
| 2013/0125043 | A1* | 5/2013 | Jeon | G06F 3/04815 |
| | | | | 715/782 |
| 2013/0174069 | A1* | 7/2013 | Lee | G06F 3/04883 |
| | | | | 715/769 |
| 2013/0215044 | A1* | 8/2013 | Ahn | G06F 3/04883 |
| | | | | 345/173 |
| 2013/0290986 | A1 | 10/2013 | Kobayashi et al. | |
| 2014/0015784 | A1 | 1/2014 | Oonishi | |
| 2014/0195964 | A1* | 7/2014 | Park | G06F 3/04817 |
| | | | | 715/781 |
| 2014/0195975 | A1* | 7/2014 | Kyoun | G06F 3/0482 |
| | | | | 715/825 |
| 2014/0245202 | A1* | 8/2014 | Yoon | G06F 3/0482 |
| | | | | 715/765 |
| 2014/0344734 | A1 | 11/2014 | Xu et al. | |

FOREIGN PATENT DOCUMENTS

| | | |
|---|---|---|
| EP | 2426898 A2 | 3/2012 |
| JP | 2012-008916 A | 1/2012 |
| JP | 2013-540297 A | 10/2013 |
| KR | 10-2012-0012541 A | 2/2012 |
| WO | 2012/018212 A2 | 2/2012 |
| WO | 2012050009 A1 | 4/2012 |
| WO | 2012101863 A1 | 8/2012 |
| WO | 2012128361 A1 | 9/2012 |
| WO | 2013/037239 A1 | 3/2013 |

OTHER PUBLICATIONS

English Translation of Office Action for corresponding RU application No. 2015145378 dated Nov. 18, 2016, serving as a supplemental explanation of references submitted on Jan. 20, 2017.
English Translation of International Search Report for PCT/JP2014/057482 dated Apr. 22, 2014.
European Search Report and Search Opinion of EP application No. 14768208.2.
English Translation of Written Opinion of the International Searching Authority for PCT/JP2014/057482 accompanied with PCT/IB/373 and PCT/IB/338 dated Sep. 22, 2015, acting as concise explanation of previously submitted reference(s).
Office Action dated Sep. 15, 2015 for corresponding JP application No. 2015-506818 and partial translation thereof.
Office Action for corresponding CN Patent Application No. 201480015793.2 dated Sep. 4, 2017, and partial translation thereof.

* cited by examiner

INFORMATION PROCESSING DEVICE, INFORMATION PROCESSING METHOD, PROGRAM, AND INFORMATION STORAGE MEDIUM

CROSS REFERENCE TO RELATED APPLICATIONS

This application is a National Stage of International Application No. PCT/JP2014/057482 filed on Mar. 19, 2014, which claims priority to Japanese Patent Application No. 2013-060526 filed on Mar. 22, 2013. The contents of each of the above documents are incorporated herein by reference in their entirety.

TECHNICAL FIELD

The present invention relates to an information processing device, an information processing method, a program, and an information storage medium.

BACKGROUND ART

There is an information processing device that, when an operation of superimposing an image (for example an icon) associated with a program on an image associated with another program is performed by a drag operation or the like, for example, performs control to create a folder linked to the two programs, and display an image associated with the folder on a display section.

SUMMARY

Technical Problem

In a situation in which a folder for linking a program that is not installed at present but is scheduled to be installed to one program that is already installed is prepared in advance, for example, it is convenient if the creation of a folder linked to one program that is already installed can be realized by a simple operation.

However, the above-described conventional information processing device requires that the two programs be linked to each other to generate the folder, and requires a complex operation for realizing display on a display section of an image associated with the folder linked to one program.

The present invention has been made in view of the above problems. It is an object of the present invention to make an image of a folder linked to one program displayed on a display section by a simpler operation than a conventional operation.

Solution to Problem

In order to solve the above problems, according to the present invention, there is provided an information processing device including: a control section; the control section displaying a program corresponding image on a display section, the program corresponding image being an image associated with a program, and being an image causing processing related to the program to be performed in response to reception of a predetermined operation on the image, and the control section changing the program corresponding image displayed on the display section and associated with the program to a folder corresponding image in response to reception of an instruction to generate a folder linked to the program, the folder corresponding image being an image associated with the folder linked to the program, and being an image causing the program corresponding image associated with the program linked to the folder to be displayed on the display section in response to reception of the predetermined operation on the image.

In addition, according to the present invention, there is provided an information processing method including: a step of displaying a program corresponding image on a display section, the program corresponding image being an image associated with a program, and being an image causing processing related to the program to be performed in response to reception of a predetermined operation on the image; and a step of changing the program corresponding image displayed on the display section and associated with the program to a folder corresponding image in response to reception of an instruction to generate a folder linked to the program, the folder corresponding image being an image associated with the folder linked to the program, and being an image causing tire program corresponding image associated with the program linked to the folder to be displayed on the display section in response to reception of the predetermined operation on the image.

In addition, according to the present invention, there is provided a program for making a computer perform: a step of displaying a program corresponding image on a display section, the program corresponding image being an image associated with a program, and being an image causing processing related to the program to be performed in response to reception of a predetermined operation on the image; and a step of changing the program corresponding image displayed on the display section and associated with the program to a folder corresponding image in response to reception of an instruction to generate a folder linked to the program, the folder corresponding image being an image associated with the folder linked to the program, and being an image causing the program corresponding image associated with the program linked to the folder to be displayed on the display section in response to reception of the predetermined operation on the image.

In addition, according to the present invention, there is provided a computer readable information storage medium storing a program for making a computer perform: a step of displaying a program corresponding image on a display section, the program corresponding image being an image associated with a program, and being an image causing the program to be executed in response to reception of a predetermined operation on the image; and a step of changing the program corresponding image displayed on the display section and associated with the program to a folder corresponding image in response to reception of an instruction to generate a folder linked to the program, the folder corresponding image being an image associated with the folder linked to the program, and being an image causing the program corresponding image associated with the program linked to the folder to be displayed on the display section in response to reception of the predetermined operation on the image.

According to the present invention, the program corresponding image displayed on the display section and associated with the program is changed to the folder corresponding image of the folder linked to the program in response to reception of the instruction to generate the folder linked to the program. Thus, the image of the folder linked to one program is displayed on the display section by a simpler operation than a conventional operation.

In one mode of the present invention, an upper limit number of programs that can be linked to the folder associated with the folder corresponding image is set in advance, when the folder corresponding image associated with the folder to which the upper limit number of programs are linked is displayed on the display section, the control section performs control so as not to link a new program to the folder, and when the control section receives an instruction to link a new program to the folder while the program corresponding images associated with the respective upper limit number of programs linked to the folder are displayed on the display section, the control section cancels linking between one of the programs linked to the folder and the folder, and links the new program to the folder.

DESCRIPTION OF EMBODIMENT

One embodiment of the present invention will hereinafter be described in detail with reference to the drawings.

Figure 1:
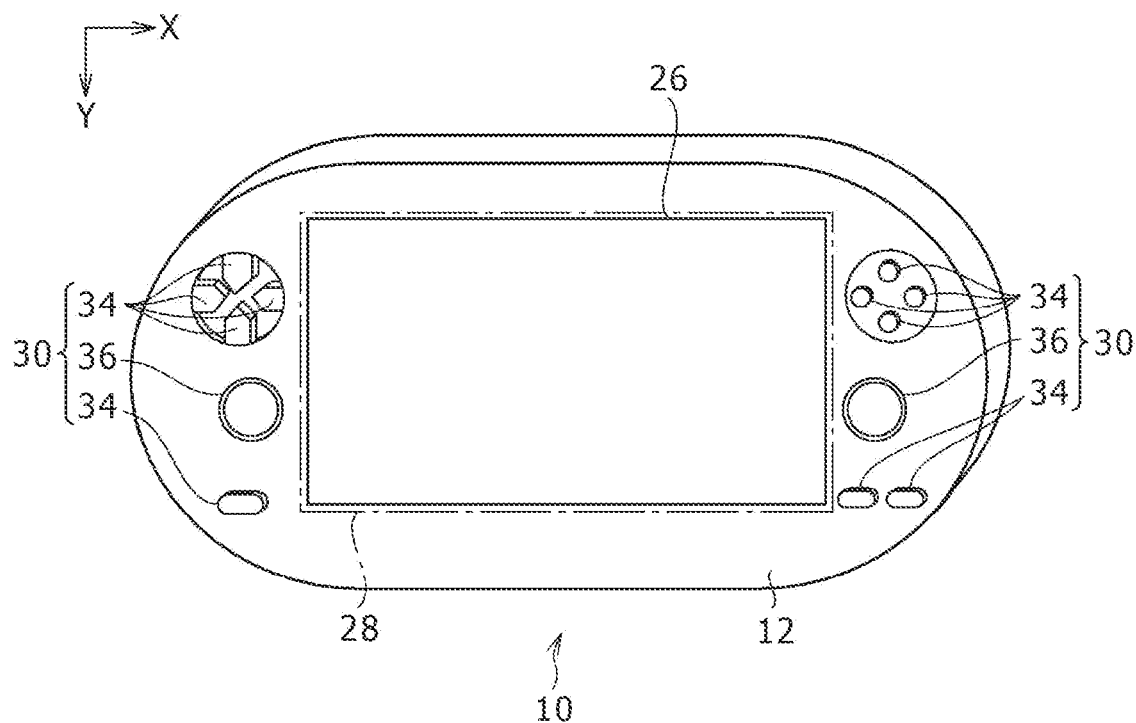
FIG. 1 is a perspective view showing an example of external appearance of an information processing device according to one embodiment of the present invention.
Figure 2:
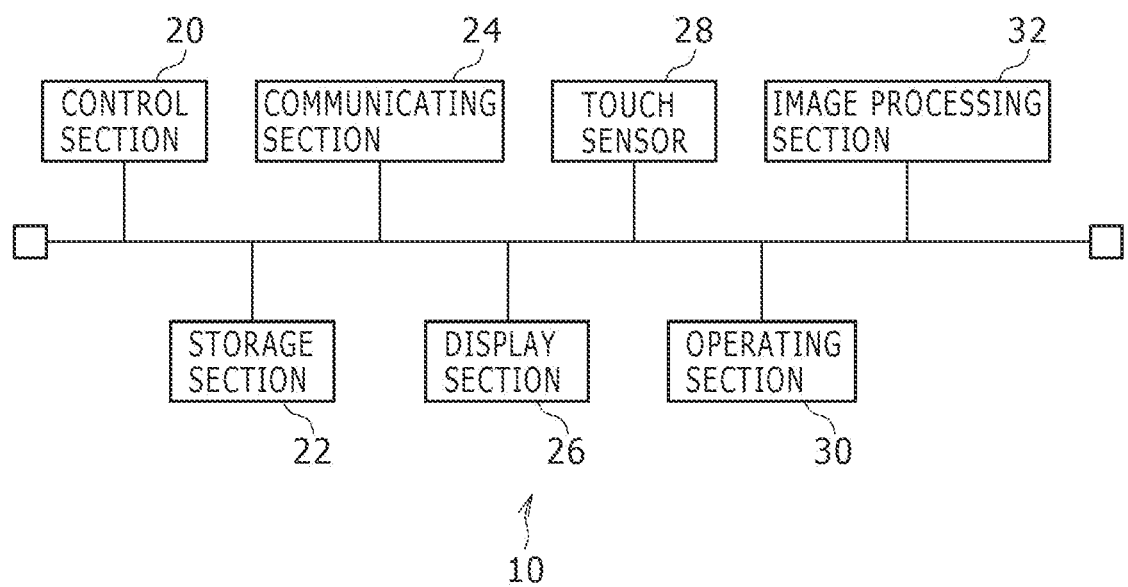
FIG. 2 is a block diagram showing an example of hardware configuration of the information processing device according to the embodiment of the present invention.

FIG. 1 is a perspective view of an example of external appearance of an information processing device 10 according to one embodiment of the present invention. FIG. 2 is a block diagram showing an example of hardware configuration of the information processing device 10 shown in FIG. 1. Suppose that the information processing device 10 according to the present embodiment is for example a portable device such as a portable game console or the like.

As shown in FIG. 1, a casing 12 of the information processing device 10 according to the present embodiment has a flat shape as a whole. As shown in FIG. 1 and FIG. 2, the information processing device 10 according to the present embodiment includes a control section 20, a storage section 22, a communicating section 24, a display section 26, a touch sensor 28, an operating section 30, an image processing section 32, and the like. These elements are connected to each other via a bus.

The control section 20 is for example a CPU or the like. The control section 20 performs various kinds of information processing according to a program stored in the storage section 22. The storage section 22 is for example a memory element such as a RAM, a ROM, or the like. The storage section 22 stores the program executed by the control section 20 and various kinds of data. The storage section 22 also functions as a work memory for the control section 20. The communicating section 24 is for example a network interface or the like (specifically, for example, a wireless LAN module). The communicating section 24 transmits information to another information processing device 10, a server (not shown) on the Internet, or the like according to an instruction input from the control section 20. The communicating section 24 also outputs received information to the control section 20.

The display section 26 represents for example various kinds of devices for displaying an image, such as a liquid crystal display panel, an organic EL display panel, and the like. As shown in FIG. 1, in the present embodiment, the display section 26 is disposed in the front surface of the casing 12, and the screen of the display section 26 has a substantially rectangular shape. Hereinafter, the horizontal direction (direction of width) of the screen will be set as an X-axis direction, and a direction from left to right as viewed from the front surface of the casing 12 will be set as an X-axis positive direction. In addition, the vertical direction (direction of height) of the screen will be set as a Y-axis direction, and a direction from top to bottom as viewed from the front surface of the casing 12 will be set as a Y-axis positive direction.

The touch sensor 28 has a substantially rectangular detecting surface having a shape and a size that correspond to the screen. When an object comes into contact with the detecting surface, the touch sensor 28 detects the contact position of the object. In addition, in the present embodiment, the touch sensor 28 sequentially detects the contact position of the object at predetermined time intervals. As shown in FIG. 1, in the present embodiment, the detecting surface of the touch sensor 28 is disposed on the front surface of the casing 12 so as to be superposed on the screen of the display section 26. Incidentally, suppose in the following description that a user (user of the information processing device 10) performs operating input by bringing a finger of the user into contact with the touch sensor 28. However, without being limited to this, the user may perform operating input by bringing an object held in a hand of the user, such as a stylus or the like, into contact with the detecting surface. In addition, the touch sensor 28 does not necessarily detect the position of the object only when the object comes into contact with the detecting surface, but may detect the position of the object with respect to the detecting surface when the object is brought into proximity to a detectable range over the detecting surface. The touch sensor 28 may be of any type such for example as a capacitance type, a pressure sensitive type, or an optical type, as long as the touch sensor 28 is a device capable of detecting the position of the object on the detecting surface. Incidentally, the information processing device 10 may include another touch sensor 28 disposed on the back surface of the casing 12 so as to be opposed to the touch sensor 28 disposed on the front surface of the casing 12.

An operation by the user of making the finger touch one point on the detecting surface of the touch sensor 28 for only a short time will hereinafter be referred to as a tap operation. In addition, an operation by the user of continuing to make the finger touch the touch sensor 28 at one point on the detecting surface of the touch sensor 28 for a predetermined time or more will be referred to as a touch and hold operation. In addition, an operation by the user of bringing the finger in contact with a starting point, which is one point on the detecting surface of the touch sensor 28, and shifting the finger to an end point, which is another point on the detecting surface of the touch sensor 28, in the state of the finger being held in contact will be referred to as a drag operation.

The operating section 30 is for example a kind of operating member used by the user to perform operating input to the information processing device 10 together with the touch sensor 28. FIG. 1 shows buttons 34 and analog sticks 36 disposed on the front surface of the casing 12 of the information processing device 10 as an example of operating members forming the operating section 30. Incidentally, the information processing device 10 may include for example a switch and a button 34 disposed on the upper side surface of the casing 12 as operating members forming the operating section 30.

The image processing section 32 includes for example a GPU and a frame buffer memory. The image processing section 32 renders an image to be displayed on the screen of the display section 26 according to an instruction output by the control section 20. As a concrete example, the image processing section 32 includes a frame buffer memory corresponding to the display region of the display section 26, and the GPU writes the image to the frame buffer memory at predetermined time intervals according to the instruction from the control section 20. Then, the image written in the frame buffer memory is converted into a video signal in predetermined timing to be displayed on the display section 26.

The information processing device 10 according to the present embodiment performs information processing in an execution mode that is one of a normal mode or an edit mode. The user can change the execution mode by performing a predetermined operation.

Figure 3:
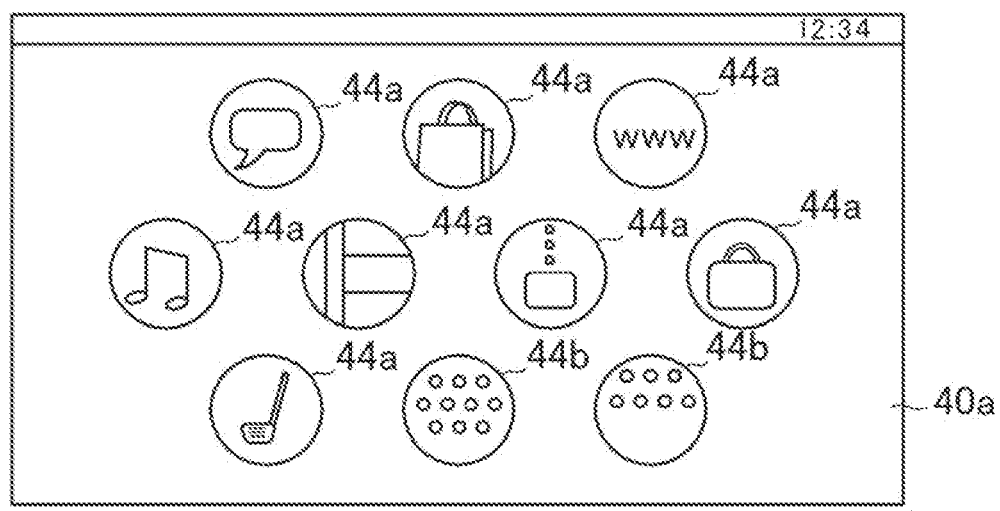
FIG. 3 is a diagram showing an example of a screen displayed on a display section.

FIG. 3 is a diagram showing an example of a screen displayed on the display section 26 when the execution mode is the normal mode. The screen shown in FIG. 3 is obtained by visualizing a virtual three-dimensional space shown in FIG. 4. FIG. 5 is a diagram showing an example of a screen displayed on the display section 26 when the execution mode is the edit mode. The screen shown in FIG. 5 is obtained by visualizing a virtual three-dimensional space shown in FIG. 6.

Figure 4:
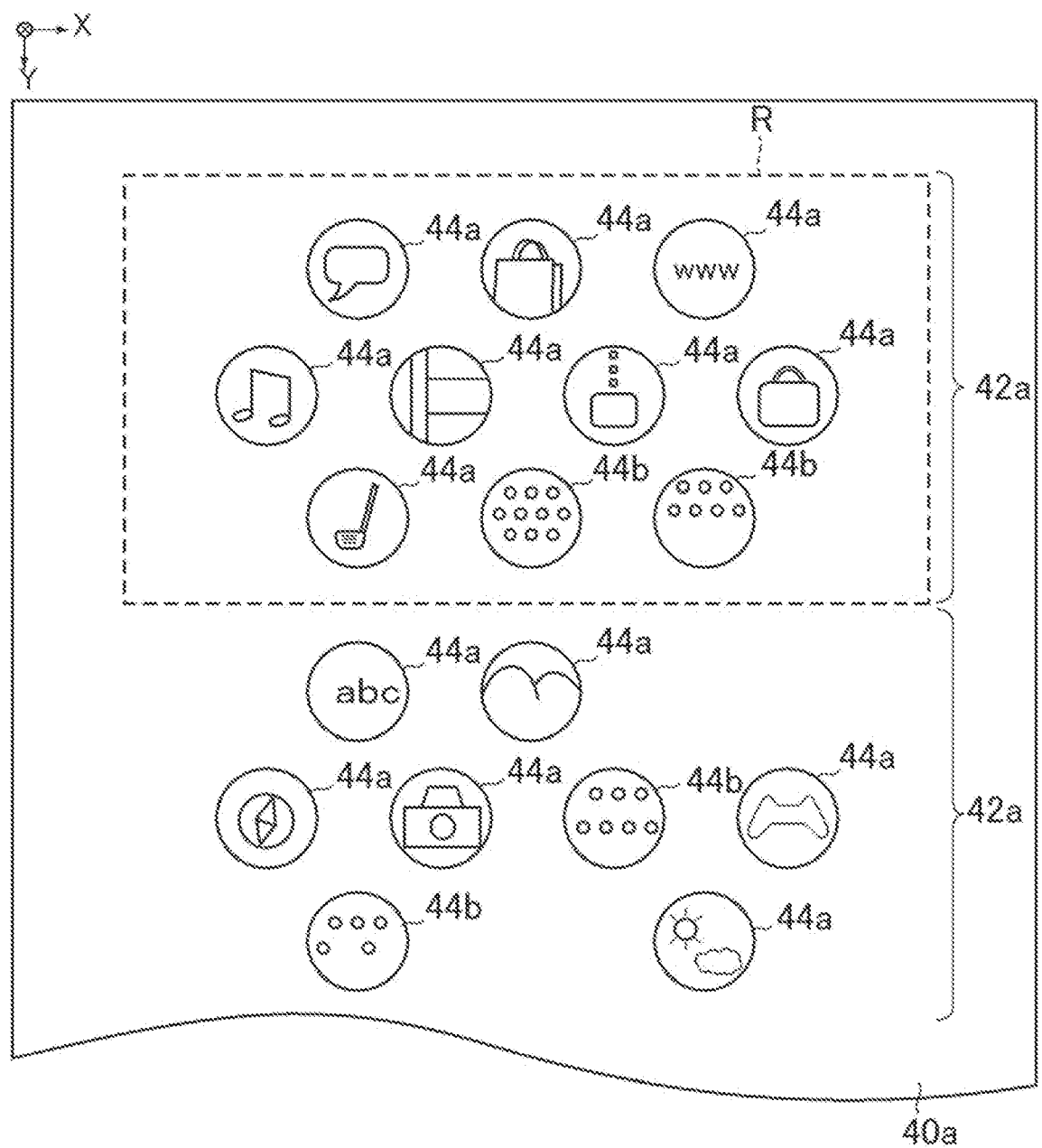
FIG. 4 is a diagram showing an example of a virtual three-dimensional space.
Figure 5:
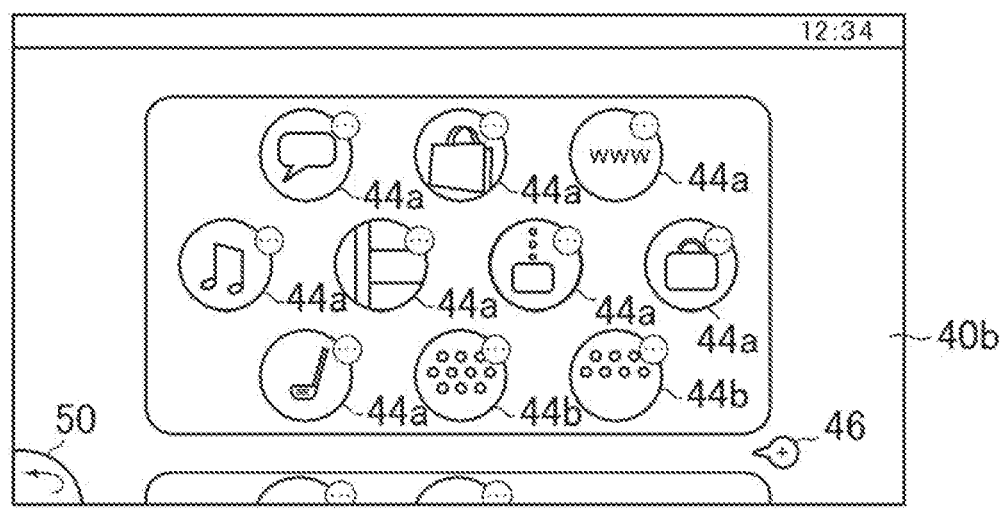
FIG. 5 is a diagram showing an example of a screen displayed on the display section.
Figure 6:
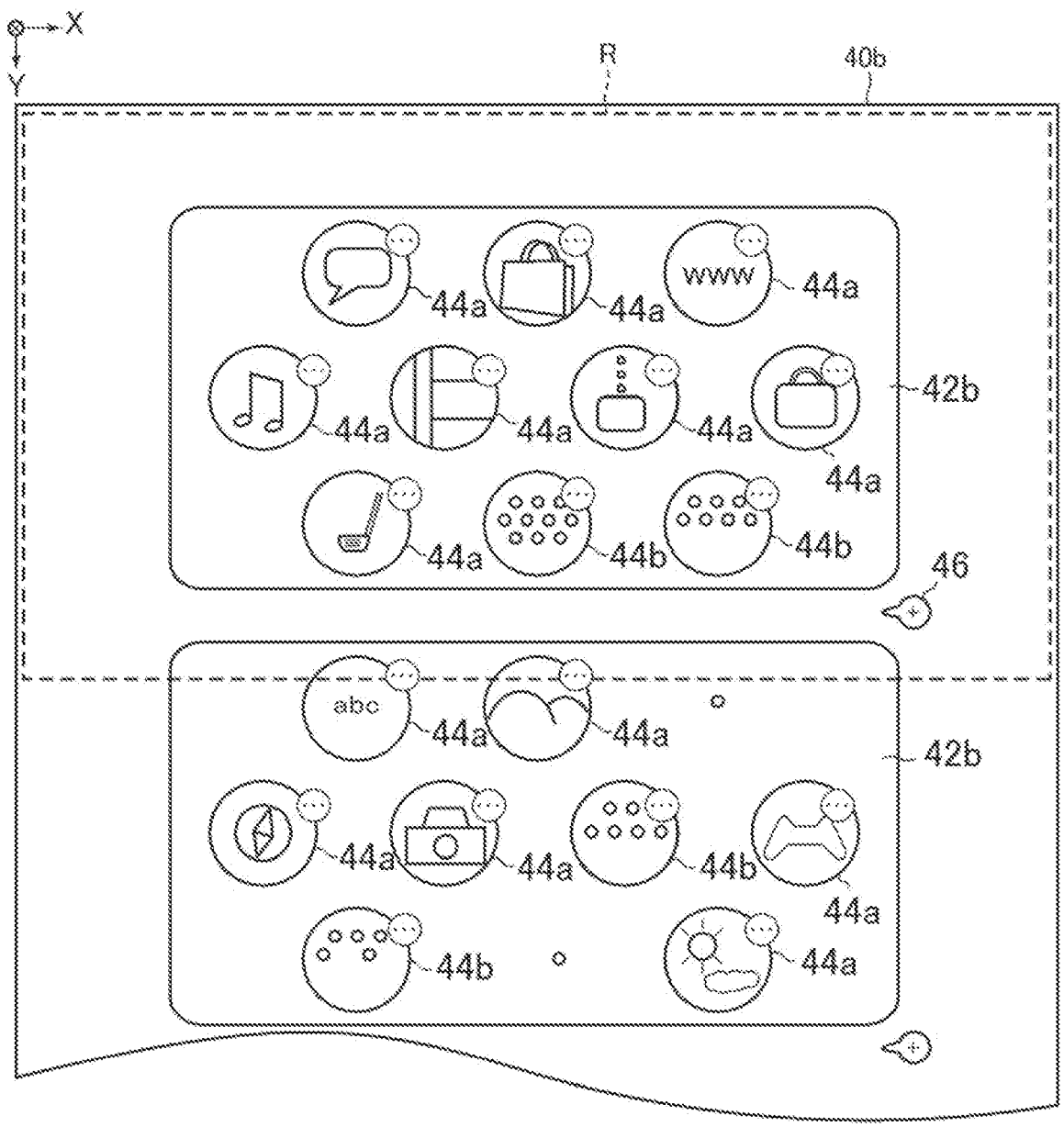
FIG. 6 is a diagram showing an example of a virtual three-dimensional space.

The direction of a horizontal axis of the virtual three-dimensional spaces shown in FIG. 4 and FIG. 6 will be set as an X-axis direction, and a direction from left to right in FIG. 4 and FIG. 6 will be set as an X-axis positive direction. In addition, a vertical direction of the virtual three-dimensional spaces shown in FIG. 4 and FIG. 6 will be set as a Y-axis direction, and a direction from top to bottom in FIG. 4 and FIG. 6 will be set as a Y-axis positive direction. In addition, a direction of depth (direction orthogonal to both of the X-axis direction and the Y-axis direction) of the virtual three-dimensional spaces shown in FIG. 4 and FIG. 6 will be set as a Z-axis direction, and a direction from front to back in FIG. 4 and FIG. 6 will be set as a Z-axis positive direction.

A home image, which is an image as a display object, is disposed in the virtual three-dimensional spaces shown in FIG. 4 and FIG. 6. The image shown in FIG. 4 will be referred to as a normal home image 40a. The image shown in FIG. 6 will be referred to as an edit home image 40b. The information processing device 10 generates an image to be displayed on the screen of the display section 26 by imaging a state in which an image disposed in a virtual three-dimensional space is viewed from a viewpoint disposed in the same space by a publicly known three-dimensional computer graphics technology.

In the present embodiment, the viewpoint is disposed at a position distant in a Z-axis negative direction from a position in which the home image is disposed in the virtual three-dimensional space. In addition, in the present embodiment, the angle of view of the viewpoint is the same irrespective of whether the execution mode is the normal mode or the edit mode. In addition, in the present embodiment, a distance between the home image and the viewpoint when the execution mode is the edit mode is longer than when the execution mode is the normal mode.

In addition, in the present embodiment, an image is displayed on the screen such that the X-axis direction and the Y-axis direction of the virtual three-dimensional space respectively coincide with the X-axis direction and the Y-axis direction in the screen.

The home image is formed by one or a plurality of page images. Hereinafter, page images forming the normal home image 40a will be referred to as normal page images 42a, and page images forming the edit home image 40b will be referred to as edit page images 42b. Then, within the home image, the page images are arranged so as to be aligned along the Y-axis direction of the virtual three-dimensional space in which the home image is disposed. Incidentally, while FIG. 4 and FIG. 6 show a home image formed by a plurality of page images, a home image may be formed by one page image.

One or a plurality of icon images, whose upper limit number is a predetermined number (for example ten), are arranged in each of the page images. In addition, in the present embodiment, positions at which icon images can be arranged within the page image are determined in advance. The positions at which icon images can be disposed will hereinafter be referred to as placeable positions. In the examples of FIG. 4 and FIG. 6, three icon images are arranged side by side in a left-right direction on the upper side of the screen. In addition, four icon images are arranged side by side in the left-right direction in the center of the screen. In addition, three icon images are arranged side by side on the lower side of the screen. Each of the positions at which the ten icon images are arranged, for example, is a placeable position in the present embodiment.

In the present embodiment, the whole of the home image cannot be displayed on the screen at a time, but only one of the page images is displayed on the screen. FIG. 3 shows a state in which a region R enclosed by a broken line in FIG. 4 is displayed on the screen. FIG. 5 shows a state in which a region R enclosed by a broken line in FIG. 6 is displayed on the screen. The size of icon images displayed on the screen in the edit mode is relatively small as compared with the normal mode. In addition, in the edit mode, part of a page image disposed above or below a page image as a display object is also displayed on the screen. In addition, the information processing device 10 displays an image in which a character string indicating a present time or the like is disposed at the upper side of the screen.

When the user performs a drag operation on the touch panel along the Y-axis direction, the information processing device 10 moves the viewpoint disposed within the virtual three-dimensional space according to the drag operation. The present embodiment thus enables the page image displayed on the screen to be scrolled (changed).

The information processing device 10 according to the present embodiment can manage one or a plurality of programs installed on the information processing device 10 by a folder such that the one or plurality of programs are linked to each other as a program group. In addition, folders managed by the information processing device 10 may include folders to which no programs are linked (empty folders). Then, an icon image is associated with a program installed on the information processing device 10 or the above-described folder. Hereinafter, an icon image associated with a program will be referred to as a program icon image 44a, and an icon image associated with a folder will be referred to as a folder icon image 44b. In the example of page images within the region R in FIG. 4, the icon image disposed at the center of the lower side and the icon image disposed at the right end of the lower side are folder icon images 44b, and the other eight icon images are program icon images 44a.

In addition, frames enclosing the respective edit page images 42b are arranged in the edit home image 40b. In addition, a page adding image 46 for the information processing device 10 to add a page image in response to a tap operation by the user is disposed at the right end of a boundary between edit page images 42b.

Then, disposed at the upper right of each of the icon images disposed in the edit home image 40b is an image indicating that a list of commands corresponding to the icon image can be displayed. The whole of an icon image provided at the upper right thereof with an image indicating that a list of commands can be displayed, for example, may be referred to as an edit icon image. Specifically, for example, the whole of a program icon image 44a provided at the upper right thereof with an image indicating that a list of commands can be displayed may be referred to as an edit program icon image. In addition, fox example, the whole of a folder icon image 44b provided at the upper right thereof with an image indicating that a list of commands can be displayed may be referred to as an edit folder icon image. In addition, images indicating placeable positions as described above are also arranged in the edit page image 42b (the images are shown as small circular images in the example of FIG. 6).

When the user performs a tap operation on a program icon image 44a while the execution mode is the normal mode, the information processing device 10 identifies a program corresponding to the program icon image 44a. Then, the information processing device 10 performs processing related to the identified program. The processing related to the identified program in this case refers to for example processing of displaying, on the display section 26, a screen on which an icon for starting the execution of the identified program, information downloaded from the Internet or the like in relation to the identified program, and the like are arranged, processing of starting the identified program (processing of starting the execution of the identified program), or the like.

When the user performs a tap operation on a folder icon image 44b while the execution mode is the normal mode, the information processing device 10 identifies a folder corresponding to the folder icon image 44b on which the tap operation is performed. Then, the information processing device 10 identifies a program linked to the identified folder. A plurality of programs may be identified at this time. In addition, when there is no program linked to the identified folder, no program is identified. Then, the information processing device 10 displays, on the display section 26, a screen displaying an intra-folder list image in which a list of program icon images 44a associated with the identified program is arranged.

Figure 7:
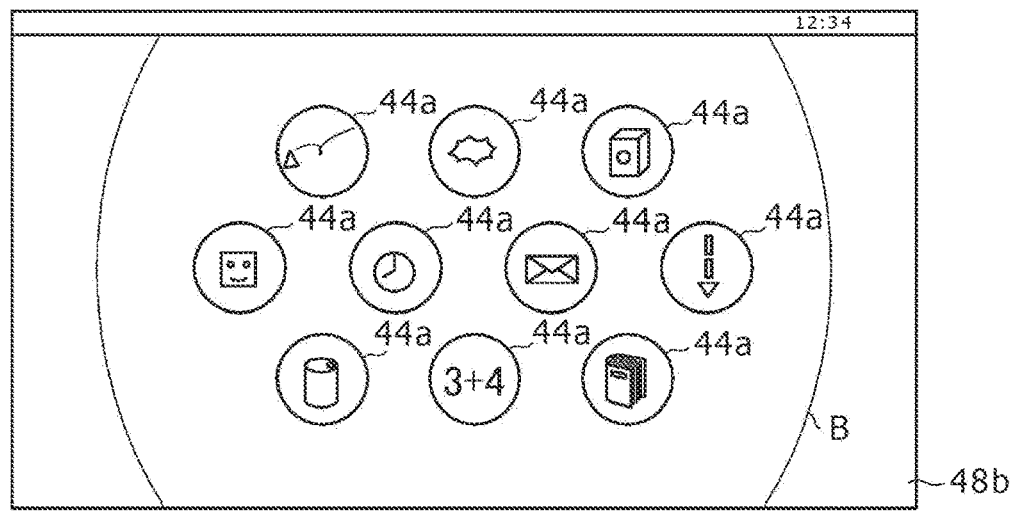
FIG. 7 is a diagram showing an example of a screen displayed on the display section.
Figure 8:
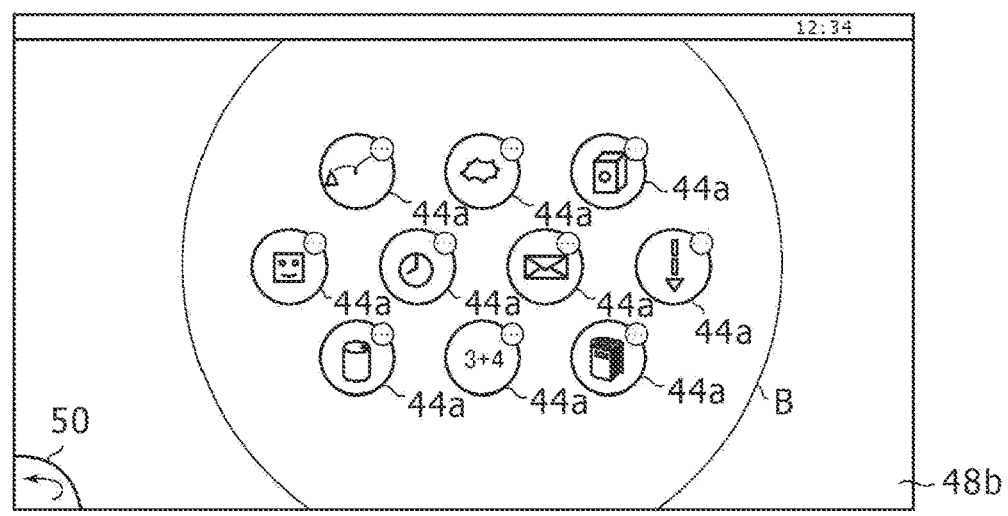
FIG. 8 is a diagram showing an example of a screen displayed on the display section.

FIG. 7 is a diagram showing an example of a screen displayed on the display section 26 when a tap operation is performed on the folder icon image 44b shown in the center of the lower side in FIG. 3 while the execution mode is the normal mode. When the above-described tap operation is performed while the execution mode is the normal mode, a normal intra-folder list image 48a is displayed on the screen as shown in FIG. 7. FIG. 8 is a diagram showing an example of a screen displayed on the display section 26 when a tap operation is performed on the folder icon image 44b shown in the center of the lower side in FIG. 5 while the execution mode is the edit mode. When the above-described tap operation is performed while the execution mode is the edit mode, an edit intra-folder list image 48b is displayed on the screen as shown in FIG. 8.

As with the page images, one or a plurality of icon images whose upper limit number is a predetermined number (for example ten) are arranged in the intra-folder list image. In the examples of FIG. 7 and FIG. 8, three icon images are arranged side by side in the left-right direction on the upper side of the screen. In addition, four icon images are arranged side by side in the left-right direction in the center of the screen. In addition, three icon images are arranged side by side on the lower side of the screen. In addition, positions at which the program icon images 44a can be arranged within the intra-folder list image are determined in advance. The positions at which the program icon images 44a can be arranged within the intra-folder list image will also hereinafter be referred to as placeable positions. In addition, a boundary line B schematically representing a boundary between the inside and the outside of the folder is disposed in the intra-folder list image.

Then, disposed at the upper right of at least part of the program icon images 44a arranged in the edit intra-folder list image 48b are images indicating that lists of commands corresponding to the program icon images 44a can be displayed. In addition, images indicating placeable positions are also arranged in the edit intra-folder list image 48b (small circular images similar to those of FIG. 6).

In addition, when the execution mode is the edit mode, the information processing device 10 displays, on the screen, a back image 50 for changing the mode in which the information processing device 10 performs processing from the edit mode to the normal mode at the lower left end of the screen displaying the edit intra-folder list image 48b, as shown in FIG. 8.

In the present embodiment, when the user performs a touch and hold operation on the touch sensor 28 while the execution mode is the normal mode, for example, the information processing device 10 changes the execution mode to the edit mode. Then, when the user performs a tap operation on the back image 50 while the execution mode is the edit mode, the information processing device 10 changes the execution mode to the normal mode.

In changing the execution mode from the normal mode to the edit mode while the normal home image 40a is displayed, the information processing device 10 for example performs processing of moving the position of the viewpoint within the virtual three-dimensional space away from the home image, processing of changing the normal home image 40a to the edit home image 40b by disposing a frame or the like in the normal home image 40a, and the like. The information processing device 10 according to the present embodiment thus enables the user to recognize easily that the execution mode has changed from the normal mode to the edit mode.

In addition, in changing the execution mode from the edit mode to the normal mode while the edit home image 40*b* is displayed, the information processing device 10 for example performs processing of moving the position of the viewpoint within the virtual three-dimensional space closer to the home image, processing of changing the edit home image 40*b* to the normal home image 40*a* by erasing the frame or the like from the edit home image 40*b*, and the like. The information processing device 10 according to the present embodiment thus enables the user to recognize easily that the execution mode has changed from the edit mode to the normal mode.

In addition, in changing the execution mode from the normal mode to the edit mode while the normal intra-folder list image 48*a* is displayed, the information processing device 10 for example performs processing of moving the position of the viewpoint within the virtual three-dimensional space away from the intra-folder list image, processing of changing the normal intra-folder list image 48*a* to the edit intra-folder list image 48*b* by disposing an image or the like to be added in the intra-folder list image, and the like.

In addition, in changing the execution mode from the edit mode to the normal mode while the edit intra-folder list image 48*b* is displayed, the information processing device 10 for example performs processing of moving the position of the viewpoint within the virtual three-dimensional space closer to the intra-folder list image, processing of changing the edit home image 40*b* to the normal home image 40*a* by erasing the image or the like to be erased from the intra-folder list image, and the like.

In addition, suppose that the user performs a tap operation on a folder icon image 44*b* while the execution mode is the edit mode. Then, the information processing device 10 changes the image displayed on the display section 26 to an edit intra-folder list image 48*b* in which a list of programs linked to a folder associated with the folder icon image 44*b* on which the tap operation has been performed is disposed.

Suppose that the user performs a tap operation on the page adding image 46 while the execution mode is the edit mode. Then, the information processing device 10 generates a new edit page image 42*b* in which no icon images are arranged. Then, the information processing device 10 updates the edit page image 42*b* by inserting the edit page image 42*b* at the position where the page adding image 46 on which the tap operation has been performed is disposed.

Figure 9:
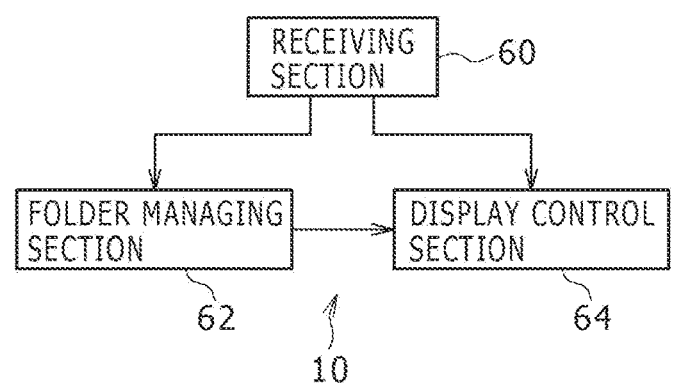
FIG. 9 is a functional block diagram showing an example of functions implemented in the information processing device according to the embodiment of the present invention.

FIG. 9 is a functional block diagram showing an example of functions implemented in the information processing device 10 according to the present embodiment. As shown in FIG. 9, the information processing device 10 functionally includes a receiving section 60, a folder managing section 62, and a display control section 64. These functions are implemented by executing a program according to the present embodiment in the information processing device 10 as a computer. This program includes instructions to control the computer so as to serve as the sections shown in FIG. 9, for example. Incidentally, FIG. 9 shows functions related particularly to the management of icon images. Then, the information processing device 10 according to the present embodiment may implement functions other than the functions shown in FIG. 9. The program may be downloaded from another computer through a communication interface via a computer communication network, and provided to the information processing device 10, or stored on a computer readable information storage medium such as an optical disk (for example a CD-ROM, a DVD-ROM, a Blu-ray (registered trademark) disk, or the like), a USB memory, a memory card, or the like, and provided from the computer readable information storage medium to the information processing device 10.

In the present embodiment, program management data, folder management data, arrangement position management data, and the like to be described in the following are stored in the storage section 22 in advance.

The program management data includes for example a program identifier as the identifier of a program installed on the information processing device 10, the program icon image 44*a* of the program, and the like. The folder management data includes for example a folder identifier as the identifier of a folder, a related program identifier as the identifier of a program linked to the folder, and the like. When there are a plurality of programs linked to the folder, a plurality of values are set as the values of related program identifiers of the folder management data. In addition, when there is no program linked to the folder, a null value (Null) is set as the value of the related program identifier of the folder management data.

The arrangement position management data includes for example type data, a management object identifier, an arrangement position identifier, and the like. The type data in this case is for example data indicating the type of an icon image managed in the arrangement position management data. In addition, the management object identifier is for example the identifier of a program or a folder associated with the icon image managed in the arrangement position management data. In addition, the arrangement position identifier is for example the identifier of a position at which the icon image is disposed.

For example, when an object managed in the arrangement position management data is a program, a value "program" is set as the value of the type data, and the program identifier of the program is set as the value of the management object identifier. In addition, when the object managed in the arrangement position management data is a folder, a value "folder" is set as the value of the type data, and the folder identifier of the folder is set as the value of the management object identifier.

The arrangement position identifier includes for example the identifier of an image in which the icon image is disposed and the identifier of the position at which the icon image is disposed within the image. The identifier of the image in which the icon image is disposed in this case is for example the identifier of a home image or the identifier of an intra-folder list image. In addition, the identifier of the position at which the icon image is disposed within the image is for example the identifier that identifies the placeable position at which the icon image is disposed within the image.

In the present embodiment, the receiving section 60 receives operations on the touch sensor 28 by the user. The folder managing section 62 for example performs generation, updating, and deletion of the folder management data and the like in response to operations received by the receiving section 60. The display control section 64 performs changing of the image disposed within the virtual three-dimensional space, movement of an icon image disposed within the virtual three-dimensional space, changing of the position of the viewpoint disposed within the virtual three-dimensional space, changing of the image displayed on the display section 26, and the like in response to operations received by the receiving section 60.

When the type data included in the arrangement position management data is "program," for example, the display control section 64 disposes the program icon image 44*a* of the program identified by the management object identifier included in the arrangement position management data at the placeable position identified by the arrangement position identifier included in the arrangement position management data.

In addition, when the type data included in the arrangement position management data is "folder," for example, the display control section 64 identifies the folder identified by the management object identifier included in the arrangement position management data. Then, the display control section 64 identifies the related program identifier included in the folder management data of the identified folder. Then, the display control section 64 generates the folder icon image 44*b* of the identified folder on the basis of the program icon image 44*a* of the program identified by the identified related program identifier. Here, for example, the display control section 64 may generate, as the folder icon image 44*b*, an image obtained by scaling down an intra-folder list image in which the program icon image 44*a* of the program identified by the identified related program identifier is disposed. Then, the display control section 64 disposes the generated folder icon image 44*b* at the placeable position identified by the arrangement position identifier included in the arrangement position management data.

Figure 10:
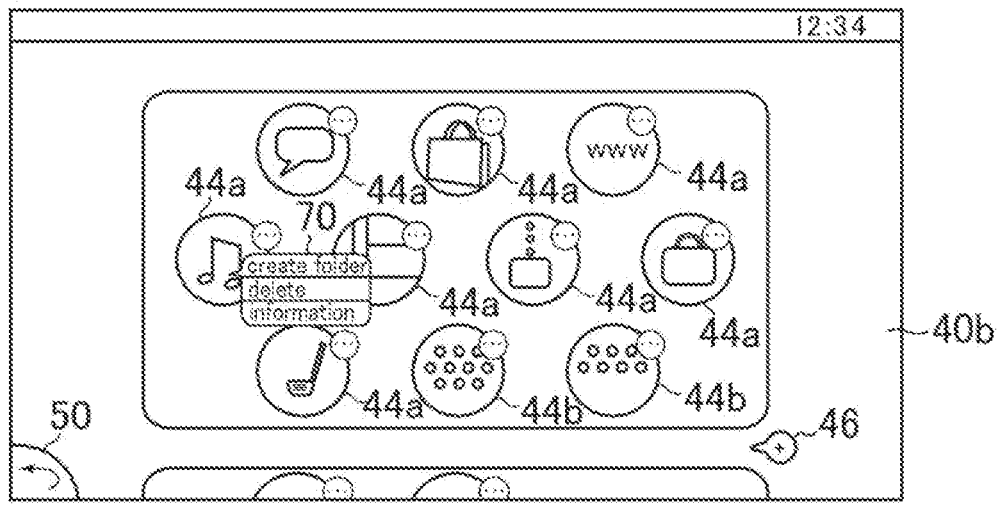
FIG. 10 is a diagram showing an example of a screen displayed on the display section.

Here, suppose in the present embodiment that the execution mode is the edit mode, and that, for example, while the image illustrated in FIG. 5 is displayed on the display section 26, the user performs a tap operation on the program icon image 44*a* at the left end of the center. Then, as shown in FIG. 10, the display control section 64 displays, on the display section 26, a context menu image 70 showing a list of commands corresponding to the program icon image 44*a*. In the example of FIG. 10, the context menu image 70 includes an image showing a command to generate a folder linked to the program icon image 44*a* (which image is shown as "create folder" in FIG. 10). The image will hereinafter be referred to as a folder generation command image.

Then, when the user performs a tap operation on the folder generation command image, the receiving section 60 receives an instruction to generate the folder linked to the program associated with the image. That is, in the present embodiment, a tap operation on the folder generation command image corresponds to an operation of inputting an instruction to generate the folder.

Then, the folder managing section 62 identifies the program associated with the program icon image 44*a* on which the tap operation has been performed. Then, the folder managing section 62 generates new folder management data in which a new value is set as the value of a folder identifier. Then, the folder managing section 62 sets the value of the program identifier of the identified program as the value of the related program identifier of the generated new folder management data. The folder managing section 62 thus links the new folder and the identified program to each other.

Then, the display control section 64 identifies arrangement position management data including the program identifier of the identified program as a management object identifier. Then, the display control section 64 changes the value of the type data included in the identified arrangement position management data from "program" to "folder." Then, the display control section 64 sets the value of the folder identifier of the generated new folder management data as the value of the management object identifier included in the identified arrangement position management data. Then, the display control section 64 changes the image displayed on the display section 26 from an image shown in FIG. 10 to an image shown in FIG. 11 on the basis of the data generated and changed as described above.

Figure 11:
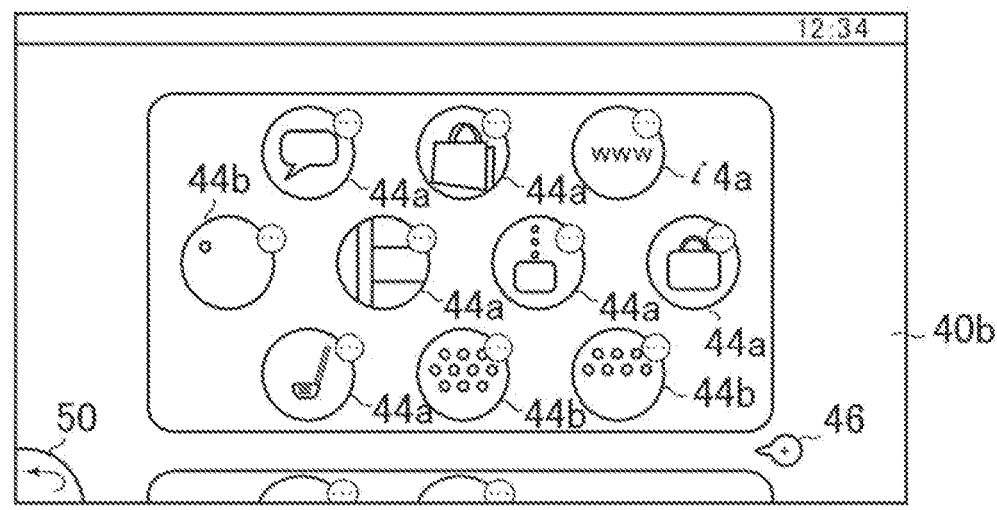
FIG. 11 is a diagram showing an example of a screen displayed on the display section.

In FIG. 11, a folder icon image 44*b* associated with the above-described new folder is disposed at the position at which the program icon image 44*a* associated with the program for which the folder generation instruction has been given is disposed in the image shown in FIG. 10. Thus, in the present embodiment, the display control section 64 changes the program icon image 44*a* displayed on the display section 26 to the folder icon image 44*b* representing the folder linked to the program associated with the program icon image 44*a*.

Figure 12:
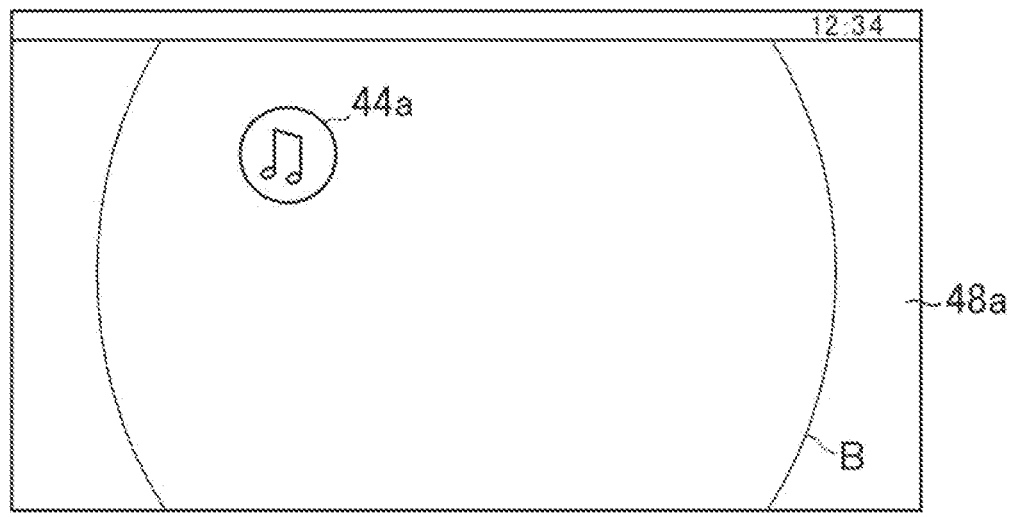
FIG. 12 is a diagram showing an example of a screen displayed on the display section.

FIG. 12 shows an example of a normal intra-folder list image 48*a* displayed when a tap operation is performed on the folder icon image 44*b* displayed on the display section 26 as described above while the execution mode is the normal mode. The program icon image 44*a* of the program for which the folder generation instruction has been given is disposed in the normal intra-folder list image 48*a* shown in FIG. 12.

Thus, according to the present embodiment, a folder icon image 44*b* linked to one program is displayed on the display section 26 by a simpler operation than a conventional operation.

Suppose that the user performs a drag operation on an icon image while the execution mode is the edit mode in the information processing device 10 according to the present embodiment. Hereinafter, the icon image on which the drag operation is performed will be referred to as a target icon image, and a position at which the target icon image is disposed before a start of the drag operation will be referred to as a start position. While the drag operation is performed, the display control section 64 performs control so as to display the target icon image at a position within the display section 26 which position is superposed on a detected position in the touch sensor 28.

When the drag operation is ended, the display control section 64 identifies a placeable position nearest to an end point of the drag operation as a goal position. Then, when an icon image different from the target icon image is not disposed at the goal position, the display control section 64 changes the value of an arrangement position identifier of arrangement position management data including the identifier of the target icon image as a management object identifier to the identifier of the goal position. Then, the display control section 64 generates an image showing a state in which the target icon image is disposed at the goal position on the basis of the arrangement position management data after the change. Then, the display control section 64 changes the image displayed on the display section 26 to the generated image.

There is a case where an icon image different from the target icon image is disposed at the identified goal position. The icon image disposed at the goal position in this case will hereinafter be referred to as a goal position icon image. When the goal position icon image is a program icon image 44*a*, the display control section 64 changes the value of the arrangement position identifier of the arrangement position management data including the identifier of the target icon image as the management object identifier to the identifier of the goal position. Then, together with the change, the display control section 64 changes the value of the arrangement position identifier of arrangement position management data including the identifier of the goal position icon image as a management object identifier to the identifier of the start position. Then, the display control section 64 generates an image showing a state in which the target icon image is disposed at the goal position and the goal position icon image is disposed at the start position on the basis of the arrangement position management data after the changes. Then, the display control section 64 changes the image displayed on the display section 26 to the generated image.

In addition, when the target icon image is a program icon image 44a, and the goal position icon image is a folder icon image 44b, the folder managing section 62 identifies the folder management data of a folder associated with the goal position icon image.

Then, the folder managing section 62 adds the value of the program identifier of a program associated with the target icon image as the value of a related program identifier of the identified folder management data. The folder managing section 62 thus links the folder associated with the goal position icon image and the program associated with the target icon image to each other.

Then, the display control section 64 changes the value of the arrangement position identifier of the arrangement position management data including the identifier of the target icon image as the management object identifier to the value of the identifier of a placeable position at which no icon image is disposed within an intra-folder list image associated with the folder associated with the goal position icon image. Then, the display control section 64 generates an image in which the goal position icon image within the image displayed on the display section 26 is replaced with a generated folder icon image 44b on the basis of the folder management data and the arrangement position management data after the change. Then, the display control section 64 changes the image displayed on the display section 26 to the generated image.

Incidentally, here, there is a case where an upper limit number of (for example ten) programs are already linked to the folder associated with the goal position icon image. In this case, the folder managing section 62 performs control so as not to link the folder and the program to each other (so as not to change the folder management data) and so as not to change the arrangement position management data. Then, the display control section 64 displays an image showing a state before the start of the drag operation on the display section 26. That is, an image showing a state in which the target icon image is disposed at the start position is displayed on the display section 26.

In addition, there is a case where the target icon image is a program icon image 44a and the finger of the user continues to touch a position at which a folder icon image 44b is disposed or the vicinity of the position for a predetermined time or more during the drag operation on the target icon image. In this case, the display control section 64 changes the image displayed on the screen to an edit intra-folder list image 48b in which a list of programs linked to a folder associated with the folder icon image 44b disposed at a target position is disposed. At this time, a state of the target icon image being displayed at the position touched by the finger is maintained.

When the drag operation is thereafter ended, the display control section 64 identifies a placeable position nearest to the end point of the drag operation within the edit intra-folder list image 48b as the goal position. Then, when an icon image different from the target icon image is not disposed at the goal position, the display control section 64 changes the value of the arrangement position identifier of the arrangement position management data including the identifier of the target icon image as the management object identifier to the identifier of the goal position. Then, the display control section 64 generates an image showing a state in which the target icon image is disposed at the goal position on the basis of the arrangement position management data after the change. Then, the display control section 64 changes the image displayed on the display section 26 to the generated image.

Here, there is a case where an icon image (goal position icon image) is disposed at the identified goal position. In this case, when the goal position icon image is a program icon image 44a, the display control section 64 changes the value of the arrangement position identifier of arrangement position management data associated with the goal position icon image.

Here, when there are placeable positions at which no icon image is disposed within the edit intra-folder list image 48b, for example, the display control section 64 identifies one of the placeable positions at which no icon image is disposed as a swap position. Then, the display control section 64 changes the value of the arrangement position identifier of the arrangement position management data including the identifier of the goal position icon image as a management object identifier to the value of the identifier of the swap position. Then, the display control section 64 changes the value of the arrangement position identifier of the arrangement position management data including the identifier of the target icon image as the management object identifier to the value of the identifier of the goal position.

Then, the display control section 64 generates an image showing a state in which the target icon image is disposed at the goal position and the goal position icon image is disposed at the swap position on the basis of the arrangement position management data after the change. Then, the display control section 64 changes the image displayed on the display section 26 to the generated image.

When there is no placeable position at which no icon image is disposed within the edit intra-folder list image 48b, on the other hand, the folder managing section 62 identifies the folder associated with the edit intra-folder list image 48b. Then, the folder managing section 62 deletes the program identifier of a program associated with the goal position icon image from the values of related program identifiers included in the folder management data of the identified folder. The folder managing section 62 thus cancels the linking between the program associated with the goal position icon image and the folder associated with the edit intra-folder list image 48b.

Then, the display control section 64 identifies arrangement position management data including the program identifier of the program associated with the goal position icon image as a management object identifier. Then, the display control section 64 changes the value of the arrangement position identifier included in the identified arrangement position management data to the identifier of a placeable position at which no icon image is disposed within the home image, for example. Then, the display control section 64 generates an image based on the folder management data and the arrangement position management data after the change. Then, the display control section 64 changes the image displayed on the display section 26 to the generated image.

In addition, there is a case where the finger of the user continues to touch a position on the outside of the boundary line B for a predetermined time or more during the drag operation on the target icon image disposed in the edit intra-folder list image 48b. In this case, the display control section 64 changes the image displayed on the screen to the edit home image 40*b* including the edit page image 42*b* in which the folder icon image 44*b* of the folder associated with the edit intra-folder list image 48*b* is disposed. At this time, the state of the target icon image being displayed at the position touched by the finger is maintained. Thereafter, as in the above-described processing, the target icon image is disposed at a placeable position nearest to the end point of the drag operation at the end point of the drag operation.

It is to be noted that the present invention is not limited to the above-described embodiment.

Figure 13:
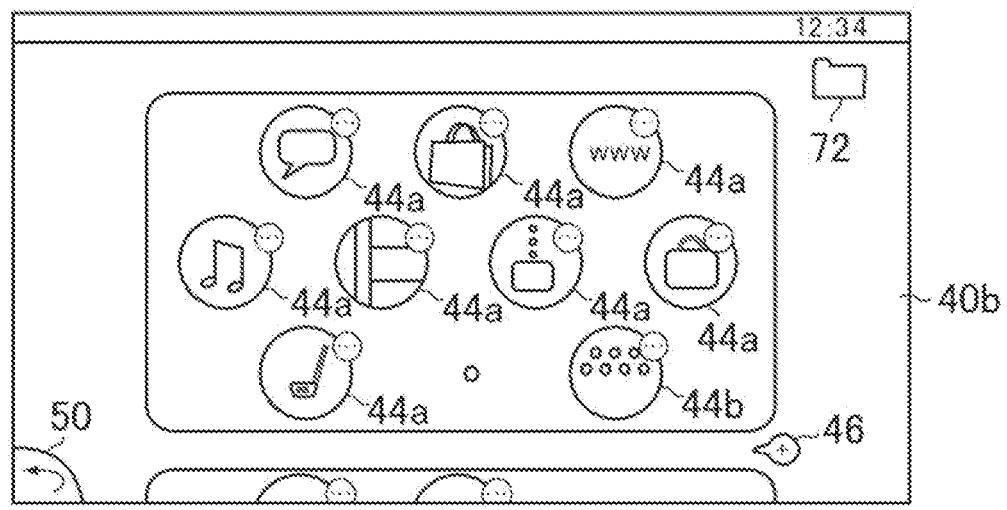
FIG. 13 is a diagram showing an example of a screen displayed on the display section.

FIG. 13 is a diagram showing an example of a screen displayed on the display section 26 in a modification of the present embodiment. The screen shown in FIG. 13 displays an edit home image 40*b*. In addition, a folder generation icon image 72 is disposed at the upper right of the screen shown in FIG. 13. Then, when the user performs a tap operation on the folder generation icon image 72, the folder managing section 62 may generate new folder management data including a null value as the value of a related program identifier.

Then, the display control section 64 may generate new arrangement position management data. In this case, "folder," for example, is set as the value of the type data of the arrangement position management data. In addition, the folder identifier of the new folder management data, for example, is set as the management object identifier of the arrangement position management data. In addition, the identifier of one of placeable positions at which no icon image is disposed within the image being displayed, for example, is set as the arrangement position identifier of the arrangement position management data. Incidentally, at this time, there may be no placeable position at which no icon image is disposed within the image being displayed. In this case, the display control section 64 may generate arrangement position management data including, as an arrangement position identifier, the identifier of one of placeable positions at which no icon image is disposed which placeable position is located outside the region R in the edit home image 40*b*.

Then, the display control section 64 may change the image displayed on the display section 26 to an image generated on the basis of the generated arrangement position management data. In the example of FIG. 13, a folder icon image 44*b* may be disposed at a placeable position at the center of a lower side, for example.

In addition, in a case where the user performs a drag operation on the folder generation icon image 72, when the drag operation is ended, the display control section 64 may identify a placeable position nearest to an end point of the drag operation as a goal position. Then, when no icon image is disposed at the goal position, the folder managing section 62 may generate new folder management data having a null value as the value of a related program identifier. Then, the display control section 64 may generate arrangement position management data including "folder" as the value of type data, including the folder identifier of the new folder management data as a management object identifier, and including the identifier of the goal position as an arrangement position identifier. Then, the display control section 64 may generate an image in which a folder icon image 44*b* associated with the empty folder is disposed at the goal position on the basis of the generated arrangement position management data. Then, the display control section 64 may change the image displayed on the display section 26 to the generated image. Thus, the folder icon image 44*b* of the empty folder is disposed at the goal position.

In addition, when the goal position icon image is a program icon image 44*a*, the folder managing section 62 may generate folder management data including the identifier of a program associated with the goal position icon image as a related program identifier. Then, the display control section 64 may generate arrangement position management data including "folder" as the value of type data, including the folder identifier of the new folder management data as a management object identifier, and including the identifier of the goal position as an arrangement position identifier. Then, the display control section 64 may generate a folder icon image 44*b* on the basis of the generated arrangement position management data. Then, the display control section 64 may generate an image in which the goal position icon image within the image displayed on the display section 26 is replaced with the generated folder icon image 44*b*. Then, the display control section 64 may change the image displayed on the display section 26 to the generated image. Thus, the folder icon image 44*b* of a folder linked to the program associated with the program icon image 44*a* disposed at the goal position is disposed at the goal position.

In addition, the information processing device 10 may perform processing to be performed in response to operation of the touch sensor 28 by the user in response to operation of the buttons 34 and the analog sticks 36 by the user.

In addition, a card slot may be disposed in the upper side surface of the casing 12 of the information processing device 10. Then, the information processing device 10 may read a program, data, and the like recorded on an information storage medium such as a memory card or the like inserted in the card slot, and write data to the inserted information storage medium such as a memory card or the like, according to instructions from the control section 20.

In addition, the information processing device 10 may include for example a hard disk drive, a microphone, a speaker, a camera, an acceleration sensor, and the like.

In addition, the above concrete character strings and the concrete character strings in the drawings are illustrative, and are not limited to these character strings.

The invention claimed is:

1. An information processing device comprising:
a control section;
a display;
wherein the control section is configured to display a program icon image on the display the program icon image causing a related program to be performed in response to reception of a predetermined operation on the program icon image;
the control section changing an image displayed at a position of the program icon image to a folder icon image in response to reception of an instruction to generate a folder linked to the program, the folder icon image being an image associated with the program icon image,
the control section displaying on the display, the program icon image when the folder icon image is operated upon,
wherein the predetermined operation on the program icon image is a touch-and-hold operation which puts the information processing device into an edit mode, followed by a tapping of the program icon image;
wherein the instruction to generate a folder occurs when the program icon image is tapped while in the edit mode, bringing up a menu which shows a first option to create a folder, wherein the option to create a folder is selected by a single tap performed on a folder generation menu; and wherein the menu further includes a second option to delete an application and a third option to provide icon application information.

2. The information processing device according to claim 1, wherein an upper limit number of programs that can be linked to the folder associated with the folder icon image is set in advance, when the folder icon image associated with the folder to which the upper limit number of programs are linked is displayed, the control section performs control so as not to link a new program to the folder, and when the control section receives an instruction to link a new program to the folder while the program corresponding images associated with the respective upper limit number of programs linked to the folder are displayed, the control section cancels linking between one of the programs linked to the folder and the folder, and links the new program to the folder.

3. An information processing method comprising:

displaying a program icon image the program icon image causing a related program to be performed in response to reception of a predetermined operation on the program icon image, changing an image displayed at a position at which the program icon image is disposed to a folder icon image in response to reception of an instruction to generate a folder linked to the program, the folder icon image being an image associated with the folder linked to only the program, and displaying the program icon image when the folder icon image is operated upon, wherein the predetermined operation on the program icon image a touch-and-hold operation which puts the information processing device into an edit mode, followed by is a tapping of the program icon image;

wherein the instruction to generate a folder occurs when the program icon image is tapped while in the edit mode, bringing up a menu which shows a first option to create a folder, wherein the option to create a folder is selected by a single tap performed on a folder generation menu; and wherein the menu further includes a second option to delete an application and a third option to provide icon application information.

4. A non-transitory computer readable information storage medium storing a program for a computer, the program comprising instructions for:

displaying a program icon image on a display the program icon image causing a related program to be executed in response to reception of a predetermined operation on the program icon image, changing an image displayed at a position of the program icon image to a folder icon image in response to reception of an instruction to generate a folder linked to the program, the folder icon image being an image associated with the program icon image, and displaying the program icon image when the folder icon image is operated upon, wherein the predetermined operation on the program icon image a touch-and-hold operation which puts the information processing device into an edit mode, followed by is a tapping of the program icon image;

wherein the instruction to generate a folder occurs when the program icon image is tapped while in the edit mode, bringing up a menu which shows a first option to create a folder, wherein the option to create a folder is selected by a single tap performed on a folder generation menu; and wherein the menu further includes a second option to delete an application and a third option to provide icon application information.

5. The information processing device according to claim 1, wherein the size of the program icon image in edit mode is smaller than when not in edit mode.

6. The information processing device according to claim 1, wherein when in edit mode a part of a page image as a display object is also displayed on the screen.

7. The information processing device according to claim 1, wherein when in edit mode a character string indicating a present time is displayed.

8. The information processing device according to claim 1, wherein when in edit mode, the program icon image includes an image indicating that a list of commands can be displayed.

9. The information processing device according to claim 8, wherein the image indicating that a list of commands can be displayed is an ellipsis.

10. The information processing device according to claim 1, wherein when in edit mode images indicating placeable positions are also displayed.

11. The information processing device according to claim 1, wherein when in edit mode the information processing device moves the position of the viewpoint within a virtual three-dimensional space.

* * * * *